United States Patent [19]

Szanto et al.

[11] Patent Number: 5,002,351
[45] Date of Patent: Mar. 26, 1991

[54] FUSION SPLICER FOR OPTICAL FIBERS

[75] Inventors: Attila J. Szanto; Murray R. Harman, both of Nepean, Canada

[73] Assignee: Preformed Line Products Company, Cleveland, Ohio

[21] Appl. No.: 215,747

[22] Filed: Jul. 5, 1988

[51] Int. Cl.⁵ .............................................. G02B 6/36
[52] U.S. Cl. .................................................. 350/96.2
[58] Field of Search ................. 65/4.3, 11.1, 269, 272; 350/96.2, 96.21, 320

[56] References Cited

U.S. PATENT DOCUMENTS

| | | | |
|---|---|---|---|
| 4,049,414 | 9/1977 | Smith | 65/152 |
| 4,152,190 | 5/1979 | Kurosawa et al. | 156/366 |
| 4,266,852 | 5/1981 | Higgins et al. | 350/96.2 |
| 4,274,707 | 6/1981 | Pacey et al. | 350/96.2 |
| 4,326,870 | 4/1982 | Bendit et al. | 65/4.21 |
| 4,350,867 | 9/1982 | Kinoshita et al. | 65/4.1 |
| 4,416,506 | 11/1983 | Johnson et al. | 350/96.2 |
| 4,548,669 | 10/1985 | Steinmann et al. | 65/152 |
| 4,557,557 | 11/1985 | Gleason et al. | 350/96.21 |
| 4,664,724 | 5/1987 | Campbell et al. | 350/96.21 X |
| 4,687,287 | 8/1987 | Lukas et al. | 350/96.2 |
| 4,695,306 | 9/1987 | Hakoun et al. | 65/152 |
| 4,735,481 | 4/1988 | Lukas et al. | 350/96.2 |
| 4,736,632 | 4/1988 | Case | 350/96.2 |
| 4,758,061 | 7/1988 | Horn | 350/96.2 |
| 4,810,054 | 3/1989 | Shinbori et al. | 350/96.2 |
| 4,832,438 | 5/1989 | Engel et al. | 350/96.2 |

FOREIGN PATENT DOCUMENTS

| | | | |
|---|---|---|---|
| 0266095 | 5/1988 | European Pat. Off. | 350/96.21 |
| 55-76315 | 9/1980 | Japan | 350/96.21 |
| 57-4015 | 1/1982 | Japan | 350/96.2 |
| 57-6817 | 1/1982 | Japan | 350/96.2 |
| 57-24907 | 2/1982 | Japan | 350/96.2 |
| 58-182609 | 10/1983 | Japan | 350/96.2 |
| 59-38719 | 3/1984 | Japan | 350/96.2 |
| 2034069 | 5/1980 | United Kingdom | 350/96.21 |

OTHER PUBLICATIONS

Iwao Hatekeyame, et al., IEEE Journal of Quantum Electronics, Fusion Splices for Single-Mode Optical Fibers, vol. QE-14, No. 8, Aug. 1978, pp. 614–619.
Yasuyuki Kato, et al., Applied Optics, Arc-Fusion Splicing of Single-Mode Fibers. 2: A Practical Splice Machine, Applied Optics, vol. 21, No. 1, Jun. 1, 1982, pp. 1916–1920.

*Primary Examiner*—John D. Lee
*Assistant Examiner*—John Ngo
*Attorney, Agent, or Firm*—Fay, Sharpe, Beall, Fagan, Minnich & McKee

[57] ABSTRACT

An apparatus for fusion splicing optical fibers includes a base member, an arc region, a clamp member, and a biasing arrangement for urging the clamp member along second and third axes as the clamp member is advanced or retracted along a first axis. The clamp member includes three fingers, each imposing a different biasing force to accommodate different sized fibers. The biasing force of the fingers may be selectively altered. A transformer bobbin includes a series of large and small grooves separated by dielectric ridges to maximize the creepage distance. Once an arc is established between opposed electrodes, constant power is provided during splicing.

21 Claims, 5 Drawing Sheets

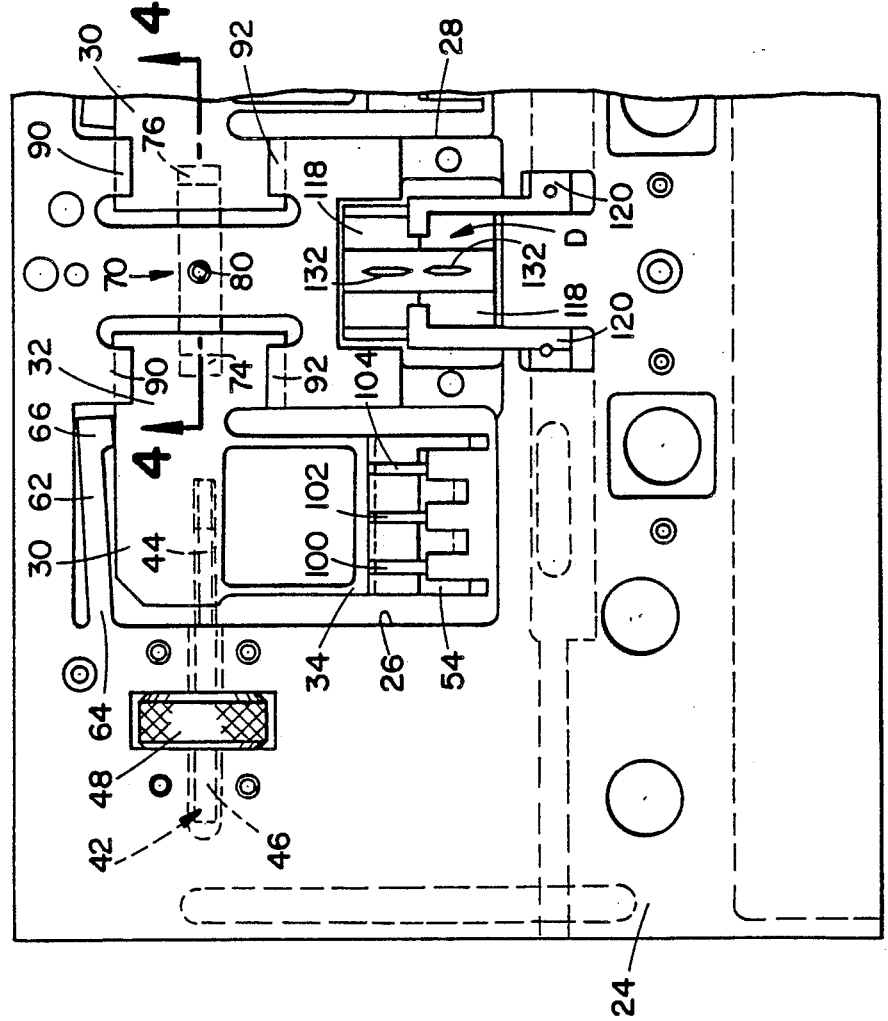
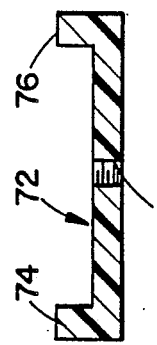
FIG. 3
FIG. 4

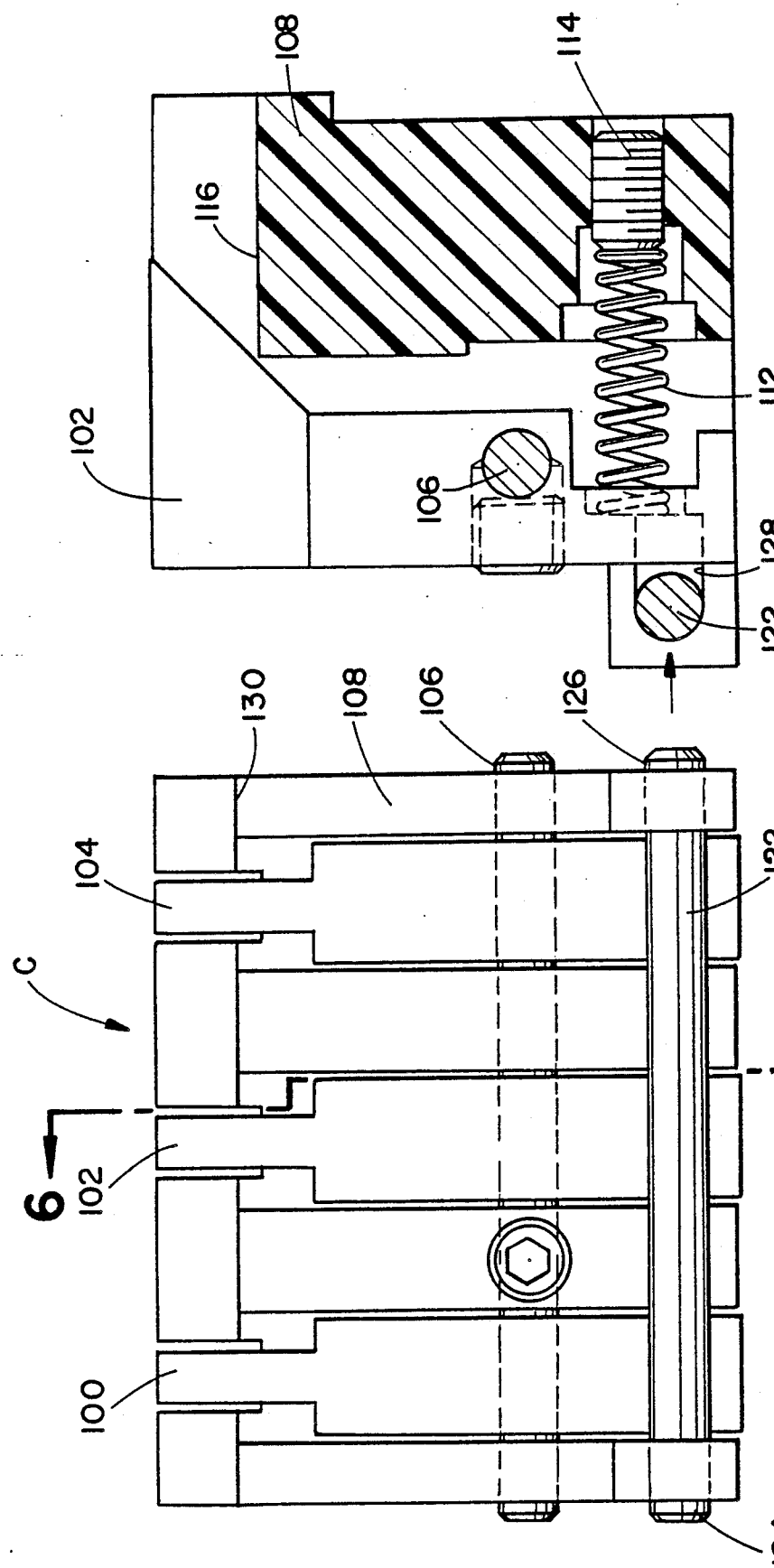

FUSION SPLICER FOR OPTICAL FIBERS

BACKGROUND OF THE INVENTION

This invention relates to a fusion apparatus, and more particularly to a fusion apparatus for joining or splicing optical fibers in axially aligned end-to-end relationship.

Known fusion splicers fall into three general categories varying in complexity and, accordingly, widely varying in expense. The first general type of alignment mechanism for a fusion splicer is known as a V-groove apparatus. In the V-groove apparatus, first and second optical fibers are aligned on the basis of the outer diameter of the respective fibers. That is, the presumption with this alignment mechanism is that the core of a fiber is centralized relative to the outer diameter. Therefore, alignment of the outer diameters of the fibers theoretically will align the cores in an effort to maximize transmissibility through the completed splice.

A second general category of apparatus for aligning optical fibers is referred to as a "local launch and detect system". Apparatus of this general type bend the light fiber at an area removed from the splice region so that a beam of light can be effectively transmitted through a sidewall of the optical fiber into the core region, transmitted through the proposed splice connection, exit through a sidewall of the second optical fiber at a second bend area, and monitored by suitable sensing means. Typically, a microprocessor is used to control precision movement of the optical fiber(s) along the X and Y axes in order to maximize the intensity of the light passing through the proposed splice region from the first fiber to the second fiber. Although deemed to be more accurate than the V-groove apparatus since the light passing through the splice region is monitored, this apparatus accordingly increases dramatically in cost due to its complexity. The overall unit is also much larger in order to accommodate the local launch and detect system.

The third general category of fusion splicers operates on the principle of "profile alignment". Rather than bending the optical fibers at an area remote from the splice region as in the local launch and detect system, the profile alignment system illuminates the ends of the respective fibers and maximizes alignment of the cores based on the reflected profiles. Again, although this apparatus is more accurate than the V-groove apparatus, it has a corresponding downside related to the complexity and increased cost of such a unit.

In each of the above types of apparatus, it is necessary to securely clamp the optical fibers during alignment and subsequent fusion procedures. Typically, spring biased clamping members exert a predetermined clamping force on a fiber. Even though many of the fusion apparatus are extremely complex as described above, the prior art has failed to adequately resolve the problem of accommodating various sizes of optical fibers. For example, the glass portion of these fibers has a diameter approximating 125 microns where the glass portion, or bare fiber as it is sometimes called, comprises a glass core and surrounding glass cladding. A multi-mode fiber has a core of approximately 60 microns and a single mode fiber has a core of approximately 8 microns. A plastic layer surrounds the glass portion and can vary widely in thickness. Therefore, the clamping members must be able to accommodate a range of diameters approximating 125 to 900 microns.

Portable fusion splicers employ a DC or AC voltage source that is effectively stepped-up to higher voltages through use of a transformer. Since extremely large voltages are required to establish an arc between the electrodes, the overall size of the fusion unit increases to accommodate the enlarged transformer necessary to raise the voltages to these levels.

The subject invention is deemed to overcome the noted problems of the prior art and others while providing a self-contained, effective fusion splicer apparatus that is substantially reduced in size without the high costs associated with more complex units. On the other hand, the subject invention represents a vast improvement over the most basic fusion splicer units.

SUMMARY OF THE INVENTION

According to the subject invention, there is provided a fusion splicer apparatus that effectively splices optical fibers together in a miniaturized unit that provides many of the benefits of substantially more expensive units.

According to the invention, the apparatus includes a base member having an arc region where fusion splicing occurs. A clamp member is received on the base member and is selectively movable along a first axis while being biased along a second axis perpendicular to the first axis.

According to a further aspect of the invention, a second biasing means is provided for urging the clamp member along a third axis mutually perpendicular to the first and second axes, while the clamp member is adjusted along the first axis.

According to another aspect of the invention, the clamp member includes first, second, and third fingers adapted for engaging selected portions of an associated optical fiber. The clamp fingers are individually biased and may be selectively adjusted to vary the tension clamping force on the associated optical fiber.

According to yet another aspect of the invention, an improved transformer bobbin includes a series of grooves adapted to receive a limited number of turns of a first winding and having dielectric material disposed between adjacent grooves.

A primary advantage of the subject invention resides in a new and improved miniaturized fusion splicing apparatus.

Another major advantage of the subject invention is found in the ability to accommodate different sized optical fibers without altering the clamping members in the field.

Still another advantage of the invention is provided by the biasing forces exerted on the clamping members along two axes while the clamping member is advanced toward an arc region along another axis mutually perpendicular to the two axes.

Yet another aspect of the invention resides in the subject new transformer that effectively steps up the voltage using a novel bobbin and winding arrangement.

Still other advantages and benefits of the invention will become more apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 3 is a plan view of approximately one-half of the face plate with the fiber advancing mechanism illustrated therein;

FIG. 4 is an enlarged view, generally along the lines 4—4 of FIG. 3 illustrating one of the biasing means of the subject invention;

FIG. 5 is a front elevational view of the clamping member of the subject invention;

FIG. 6 is a cross-sectional view taken generally along the lines 6—6 of FIG. 5; and, FIG. 7 is a cross-sectional view of the subject new transformer bobbin.

DETAILED DESCRIPTION OF THE PREFERRED EMBODIMENT

Figure 1:
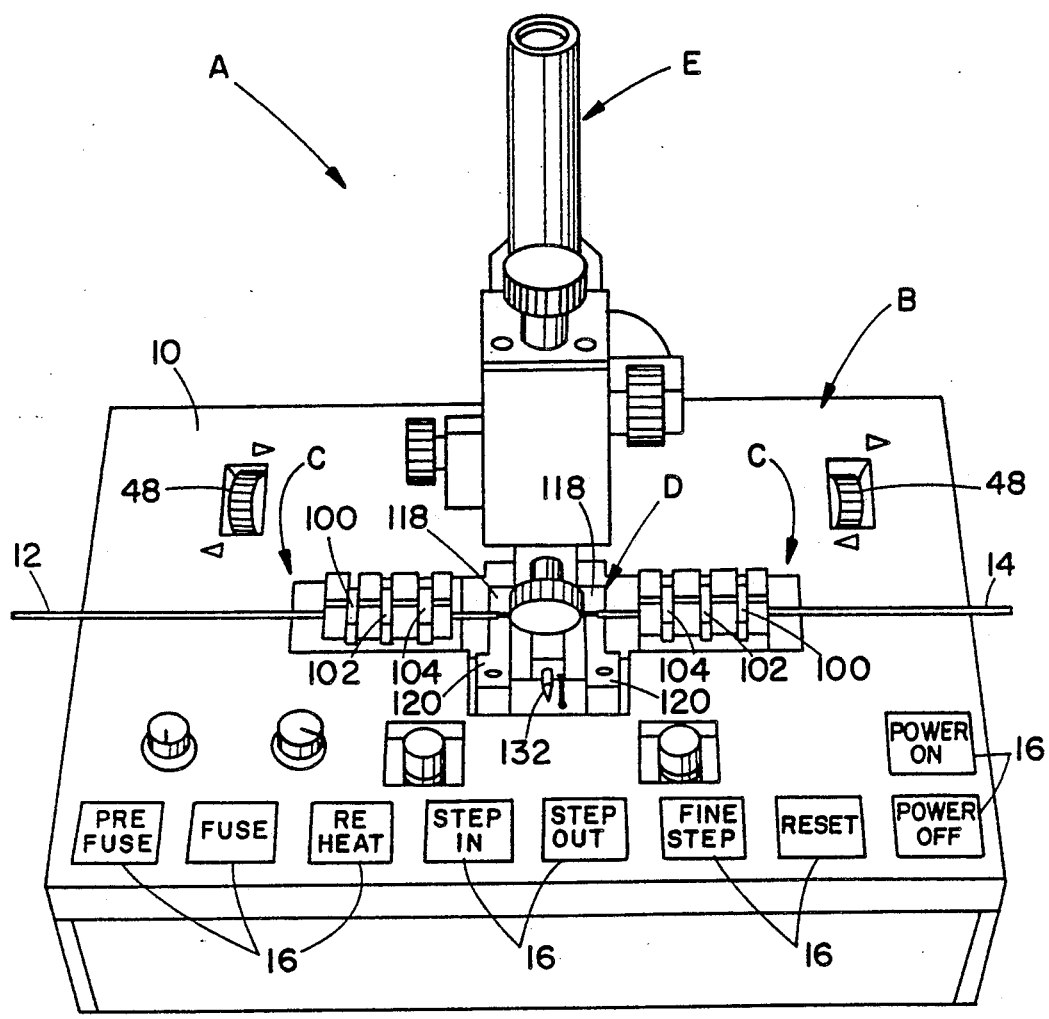
FIG. 1 is a first perspective view of the subject new fusion splicer apparatus.

Referring now to the drawings wherein the showings are for purposes of illustrating the preferred embodiment of the invention only and not for purposes of limiting same, the FIGURES show the subject new fusion splicer apparatus A having a base member B, clamping assembly C, central arc region D, and microscope E.

Figure 2:
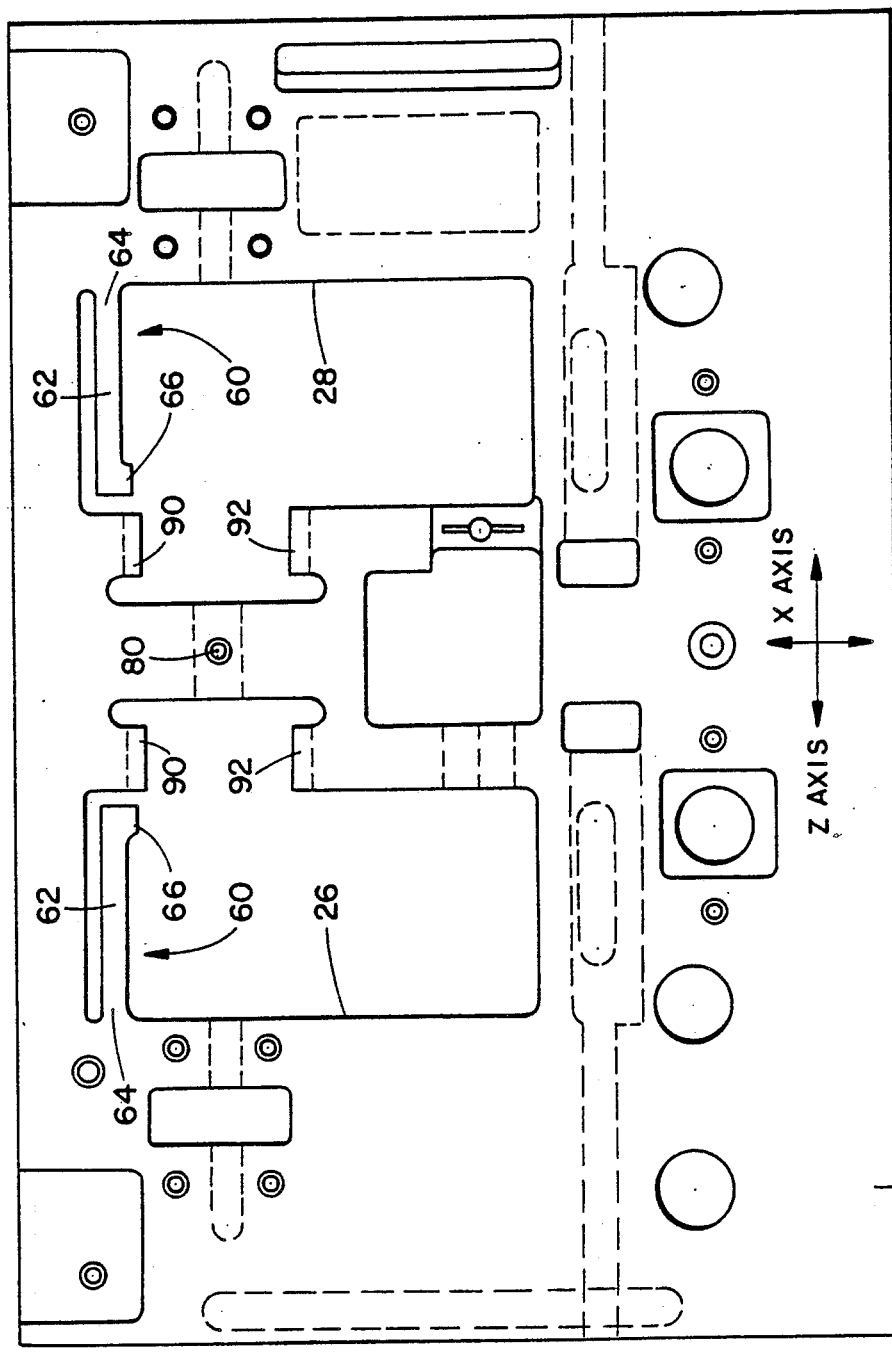
FIG. 2 is a plan view of a face plate of the base member with the fiber advancing mechanism removed for ease of illustration.
Figure 7:
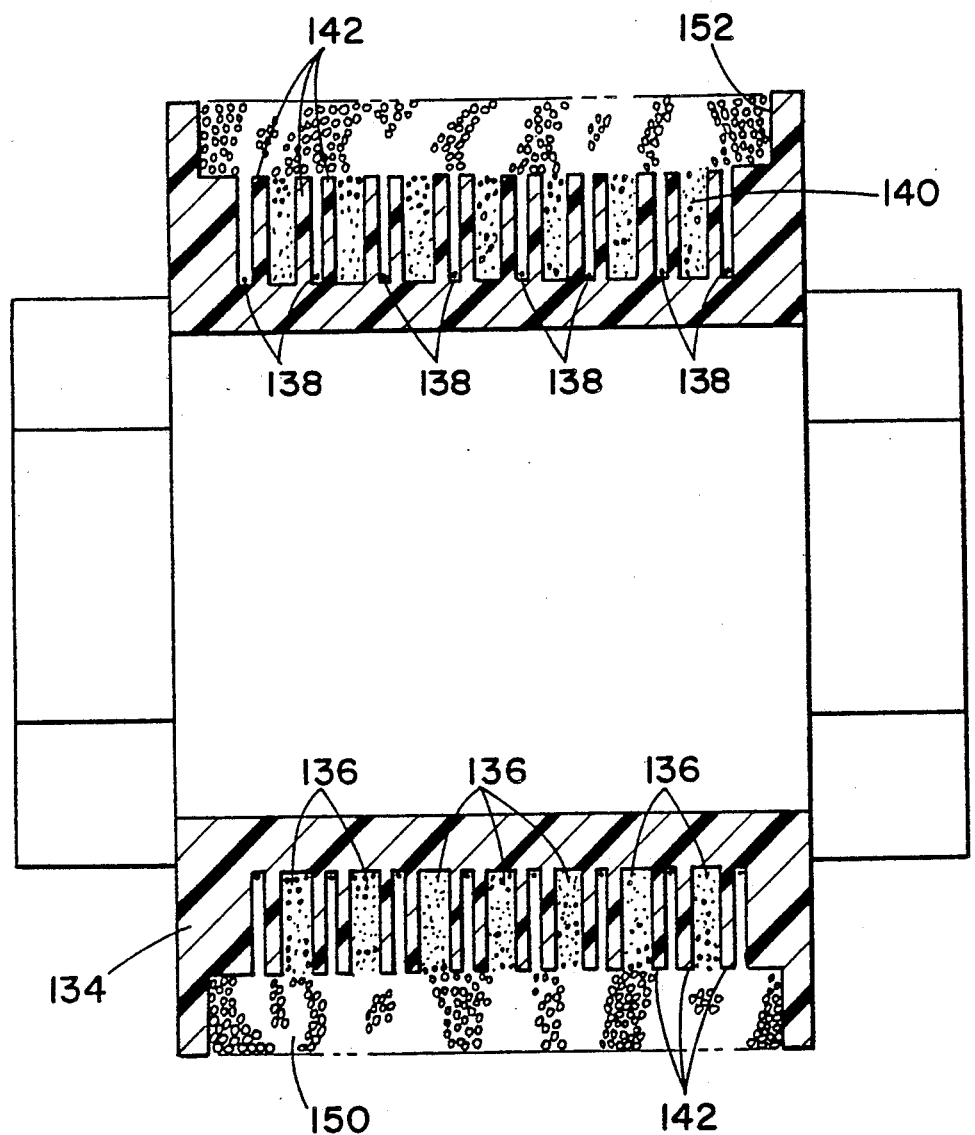

More particularly, and with reference to FIGS. 1–3, the base member of the fusion splicer apparatus includes a generally planar upper surface 10 adapted to receive first and second optical fibers 12, 14 for fusion splicing in the central arc region D. A series of control pads or keys 16 are adapted to control various functions of the fusion splicer apparatus as is well known in the art. Among them are control keys for turning the apparatus on and off, advancing clamped optical fibers toward and away from one another, prefusing the cut ends of the optical fibers to clean for an effective splice, and a fuse control key adapted to strike or establish an arc and advance the optical fibers toward one another in a conventional fusion splicing manner. Of course, other functions and control keys may be incorporated into the fusion splicing apparatus as desired and without departing from the overall scope and intent of the subject invention.

Beneath planar surface 10 is a face plate 24 that may be molded or formed from any of a number of conventional materials. According to the preferred embodiment, the face plate is an acrylic material that defines first and second cavities 26, 28. The cavities are essentially identical, mirror or symmetrical images of one another so that discussion of one cavity is applicable to the other cavity unless noted otherwise. Therefore, like numerals are utilized to reference like parts for either the left-hand or right-hand portions of the splicer apparatus. Each cavity has a generally L-shaped configuration adapted to closely receive an advancing means including a first or sliding block 30. A first leg 32 of the sliding block extends generally along a first axis, referenced as the Z axis, for limited movement in the cavity. Likewise, a second leg 34 of the sliding block extends generally along a second axis, referenced as the X axis. At approximately the juncture between the first and second legs of the sliding block, a means for advancing the sliding block along the Z axis is secured thereto. More specifically, the advancing means includes a threaded shaft 42 having a first end 44 secured to the sliding block and a second end 46 received in a rotary actuating member such as wheel 48. Selective rotation of the turning wheel advances the sliding block toward and away from the arc region D for coarse adjustment procedures.

Selective advancement of the sliding block is transferred into movement of the clamping assembly C. Particularly, a clamping member 54 is received on the second leg 34 of the sliding block at an area remote from the advancing means. Since the optical fibers 12,14 are received in the clamping assembly C, it is critical that advancement along the Z axis be maintained substantially linear as will become more apparent hereinbelow. To also facilitate advancement and alignment of the fibers, an operator uses the microscope E to enlarge the view of the fibers in the arc region.

To maintain linear movement of the sliding block and clamping assembly, a first biasing means 60 urges the sliding block along the X axis. This preloading or tensioning provided by the first biasing means assures that movement of the sliding block along the Z axis is substantially linear. The first biasing means includes a cantilever member 62 having a first end 64 secured to the faceplate and a second end 66 free to move relative to the remainder of the face plate. As illustrated in FIG. 2, prior to insertion of the advancing means, particularly the sliding block 30, the cantilever member 62 is disposed generally parallel to the Z axis. Once the sliding block is inserted into the cavity, the free end 66 of the cantilever member engages the sliding block and is urged toward the upper sidewall of the cavity. The memory of the cantilever member material acts as the biasing force that continually urges the sliding block along the X axis in an attempt to return the cantilever member into a parallel X axis disposition. Still other equivalent biasing means could be used as suitable alternatives.

A second biasing means 70 is defined by elongated member 72 having first and second legs 74, 76 disposed on opposite sides of a central mounting region 78 (FIG. 4). The elongated member 72 is secured by fastening means such as screw 80 to an underside of the faceplate. A first leg 74 of the elongated member engages an underside of the sliding block 30 in the first cavity, while a second leg 76 of the elongated member engages the underside of the sliding block in the second cavity 28. The elongated member urges the sliding blocks along a third axis, referenced as the Y axis, that extends outwardly from the page in FIG. 2 and 3. The Y axis is generally parallel to the axis of the microscope E and the first, second, and third axes are mutually perpendicular as will be understood by one of ordinary skill in the art.

The first leg 32 of the sliding block is restrained by a pair of overhanging ledges 90, 92 engaging an upper side of the sliding block and limiting the upward movement of the sliding block resulting from the elongated member 72. Just as the cantilever member facilitates linear movement of the sliding block, so, too, does the second biasing means 70 limit any movement of the sliding block along the Y axis as the sliding block is actuated by advancing means along the Z axis.

With continued reference to FIGS. 1–3, and additional reference to FIGS. 4 and 5, the clamping assembly C will now be described in greater detail. As indicated above, the clamping assembly is secured to the second leg of the sliding block so that advancement and retraction of the sliding block along the Z axis is imparted to the clamping assembly. Again, description of the left-hand clamping assembly is equally applicable to the right-hand clamping assembly unless noted otherwise.

The clamping assembly includes first, second, and third clamping fingers 100, 102, 104 that pivot around shaft 106 in clamp block 108. Biasing means such as spring 112 is provided for each finger to urge the finger to a closed position relative to the clamp block. Each spring is individually adjustable by a set screw 114 so as to alter the biasing force on the finger if desired. A recessed channel 116 is axially aligned with V blocks 118 associated with the arc region D. A stripped or cleaved portion of the optical fiber is received in the V-block while the fingers 100, 102, 104 typically clamp along an area of the fiber protected by the plastic coating. As described above, each of the fingers is individually adjustable to impose a predetermined biasing force on the optical fiber.

Preferably, each of the fingers has a different biasing force so that the clamping assembly will accommodate different sized optical fibers. The third finger 104 disposed closest to the arc region has the lightest tension so as not to bend a bare fiber. The tension on fingers 100, 102 increases as the fingers are disposed axially outward from the arc unit. In this manner, the smallest diameter fibers will be most tightly held by the outermost finger 100 and an intermediate biasing force provided by the second finger 102. The biasing forces will be preset during initial factory assembly so as to accommodate anticipated diameters of different optical fibers. Even then, each biasing force of the separate fingers may be altered by advancing or retracting the set screw 114 to change the closing force imposed on a respective finger. An extremely light tension is provided by hold-down arm 120 at an area interposed between the clamp block assembly and the V-block. This arrangement provides even further stabilization of the optical fiber during the fusion splicing process but is not designed to provide the primary clamping force.

An actuating rod 122 extends along the clamp block with opposite ends 124, 126 received in elongated slots 128 defined in flanges of the clamp block. An actuating member (not shown) selectively imposes an opening force on the rod 122 and urges the rod generally in the X axis direction. When the rod engages the fingers, it imposes a movement or torque on the fingers around shaft 106 and in opposition to the biasing force of springs 112. The fingers are then urged away from recessed channel 116 to receive the fibers therein. Once the opening force is released from the rod, the springs urge the fingers to clamp the optical fiber against face 130 of the clamp block.

As is known in the art, first and second arc electrodes 132 receive the ends of the optical fibers 12, 14 therebetween. A large voltage is supplied to the electrodes to eventually strike an arc across the air gap in which the fiber ends are disposed. The ends of the fibers are then melted and advanced a minute amount along the Z axis and toward one another to complete the splicing process.

Since fusion splicers of this type are preferably portable, it is necessary to step-up the voltage from a battery source (or AC source) to extreme levels to strike an arc necessary for the fusion process. According to the preferred embodiment, a bobbin 134 is received over a ferrite core (not shown) and adapted to receive primary and secondary windings. A series of large grooves or slots 136 are axially spaced along the bobbin to receive the first winding of a fine wire such as a grade #42 wire. Interposed between the large grooves 136 are a series of small grooves or slots 138 adapted to receive only a partial turn of the internal winding 140 as it extends from one large groove to the next adjacent large groove. Radially extending ridges 142 define walls or dividers between the large and small grooves and are formed of the same dielectric material as the remainder of the bobbin 134. This minimizes the voltage for a selected number of turns or "maximizes the creepage distance" of the entire internal winding 140. In other words, if a voltage is imposed on the internal winding composed of fine wire there is a tendency to establish an arc as the number of turns increases. In order to prevent arcing and fusion of the wire, the dielectric ridges 142 are employed. Additionally, the grooves provide a means for organizing the internal windings. Preferably, a predetermined number of turns are provided in the leftward-most groove, then the wire passes through the adjacent small groove 138 before it enters the next large groove 136. Adjacent large grooves have the winding wrapped in the same direction which also maximizes the creepage distance of the transformer assembly.

Once the internal winding is completed, a second winding 150 of a heavier grade wire is provided in the radial recess 152 that coincides with the radially outer extent of the ridges 142. This particular winding arrangement increases the voltage and continues to build the voltage until striking an arc between the electrodes 132 to establish a current therebetween. The transformer does not itself maintain constant current but is rather fed from a constant current supply circuit. The purpose of the transformer is to provide a reliable, compact means for stepping-up the battery voltage to arc potential levels.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus for fusion splicing optical fibers comprising:
    a base member;
    an arc region defined on said base member;
    a clamp member received on said base member for securing an associated optical fiber therein, said clamp member being selectively movable along a first axis for advancement toward said arc region, said clamp member including first, second, and third fingers for engaging selected portions of the associated optical fiber, and means for biasing said fingers to impose different magnitude clamping forces on the associated optical fiber;
    means for advancing said clamp member along said first axis; and
    first means for biasing said clamp member along a second axis that is perpendicular to said first axis.

2. The apparatus as defined in claim 1 wherein said first biasing means includes a cantilevered tension member operatively engaging said clamp member to urge said clamp member along said second axis.

3. The apparatus as defined in claim 1 wherein said base member includes a cavity defined therein receiving a first block operatively engaging said clamp member, said first block being interposed along said second axis between said first biasing means and clamp member.

4. The apparatus as defined in claim 1 further comprising second means for biasing said clamp member along a third axis that is mutually perpendicular to said first and second axes.

5. The apparatus as defined in claim 4 wherein said second biasing means includes an elongated member urging said clamp member along said third axis, said elongated member having first and second depending flanges engaging said first block and means for securing a central region of said elongated member to said base member.

6. The apparatus as defined in claim 1 wherein said advancing means includes a shaft secured at one end to said base member and a first block at another end, and means for selectively rotating said shaft to move said clamp member relative to said base member.

7. An apparatus for fusion splicing optical fibers comprising:
 a base member;
 an arc region defined on said base member;
 a clamp member receiving on said base member for securing an associated optical fiber therein, said clamp member including first, second, and third fingers adapted for engaging selected portions of the associated optical fiber; and
 means for biasing said first, second, and third fingers toward engagement with the associated optical fiber, said biasing means including first, second, and third independently adjustable springs for imposing a different force on the associated fiber.

8. The apparatus as defined in claim 7 wherein said first finger is disposed adjacent said arc region and has the lightest tension of said fingers.

9. The apparatus as defined in claim 8 wherein said second finger has a greater tension than said first finger and said third finger has a greater tension than said second finger.

10. The apparatus as defined in claim 9 wherein said third finger is disposed the furthest of said fingers from said arc region.

11. The apparatus as defined in claim 7 wherein said clamp member is selectively movable along a first axis for advancement toward said arc region, said apparatus further comprising first means for biasing said clamp member along a second axis that is perpendicular to said first axis.

12. The apparatus as defined in claim 11 further comprising second means for biasing said clamp member along a third axis that is mutually perpendicular to said first and second axes.

13. An apparatus for fusion splicing optical fibers comprising:
 a base member;
 an arc region defined on said base member;
 a clamp member received on said base member and adapted to secure an associated optical fiber therein, said clamp member being selectively movable along a first axis for advancement toward said arc region, said clamp member including first, second, and third fingers adapted for engaging selected portions of the associated optical fiber;
 first means for biasing said clamp member along a second axis that is perpendicular to said first axis; and,
 second means for independently biasing said first, second, and third fingers to provide three distinct tension forces on the associated optical fiber.

14. The apparatus as defined in claim 13 further comprising means for adjusting said second biasing means.

15. The apparatus as defined in claim 13 further comprising means for independently adjusting said second biasing means.

16. The apparatus as defined in claim 13 wherein said first finger is disposed adjacent said arc region and has the lightest tension force.

17. The apparatus as defined in claim 16 wherein said second finger has a greater tension force than said first finger and said third finger has a greater tension force than said second finger.

18. The apparatus as defined in claim 17 wherein said third finger is disposed furthest from said arc region.

19. An apparatus for fusion splicing optical fibers comprising:
 a base member;
 a clamp member received on said base member and adapted to secure an associated optical fiber therein; and,
 means for increasing voltage from an associated source, said increasing means including a bobbin having plural grooves defined therein and dielectric means disposed between said grooves to prevent establishing an arc on said voltage increasing means.

20. The apparatus as defined in claim 19 wherein said grooves include a first set receiving multiple turns of a first winding therein and a second set disposed between adjacent grooves of said first set.

21. The apparatus as defined in claim 20 wherein a second winding is received over said first winding at an area disposed radially outward from said groove.

* * * * *